United States Patent
Unagida et al.

(10) Patent No.: US 9,021,822 B2
(45) Date of Patent: May 5, 2015

(54) AIR CONDITIONER HAVING A VARIABLE SPEED INDOOR SIDE BLOWER AND FLAPS BEING CONTROL BASED ON OUTSIDE AIR TEMPERATURE AND INDOOR HEAT EXCHANGER TEMPERATURE

(75) Inventors: Hiroaki Unagida, Kumagaya (JP); Masato Watanabe, Oizumi-machi (JP)

(73) Assignee: Panasonic Intellectual Property Management Co., Ltd., Osaka-shi (JP)

(*) Notice: Subject to any disclaimer, the term of this patent is extended or adjusted under 35 U.S.C. 154(b) by 1200 days.

(21) Appl. No.: 12/951,209

(22) Filed: Nov. 22, 2010

(65) Prior Publication Data
US 2011/0138830 A1 Jun. 16, 2011

(30) Foreign Application Priority Data
Dec. 16, 2009 (JP) .................................. 2009-284931

(51) Int. Cl.
*F25D 17/06* (2006.01)
*F24F 11/00* (2006.01)

(52) U.S. Cl.
CPC ........... *F24F 11/0079* (2013.01); *F24F 11/008* (2013.01); *F24F 11/0034* (2013.01); *F24F 2011/0013* (2013.01); *Y02B 30/746* (2013.01)

(58) Field of Classification Search
CPC .............. F24F 11/0078; F24F 11/0079; F24F 11/0012; F24F 11/0034; F24F 11/008; F24F 13/08; F24F 13/14; F24F 13/1413; F24F 2011/0013; F24F 2011/0012; F24F 2011/0035; F24F 2011/0036; Y02B 30/746
USPC ........... 62/177–180, 183, 186, 404; 236/49.3, 236/DIG. 9
See application file for complete search history.

(56) References Cited

U.S. PATENT DOCUMENTS 4,407,447 A * 10/1983 Sayegh .................... 236/49.3
4,603,556 A * 8/1986 Suefuji et al. .............. 62/180
4,966,009 A * 10/1990 Ishii et al. .................. 62/160
(Continued)

FOREIGN PATENT DOCUMENTS

JP 04-106363 A 4/1992
JP 5-332593 A 12/1993
(Continued)

OTHER PUBLICATIONS

JPH0960924A (English Machine Translation).*
(Continued)

*Primary Examiner* — Marc Norman
*Assistant Examiner* — Paolo Gonzalez
(74) *Attorney, Agent, or Firm* — Westerman, Hattori, Daniels & Adrian, LLP (57) ABSTRACT

There is disclosed an air conditioner which can realize appropriate air conditioning control in a situation closer to a feeling temperature even in a case where a floor surface of a room to be conditioned is low. The air conditioner which blows air subjected to heat exchange between the air and a user side heat exchanger into a room to be conditioned by an indoor side blower comprises a user side controller which controls a revolution speed of the indoor side blower based on the present temperature in the room and a set temperature, and this controller raises the revolution speed of the indoor side blower in a case where an outside air temperature is not higher than a predetermined revolution speed rise temperature during a heating operation.

1 Claim, 8 Drawing Sheets

(56) References Cited

U.S. PATENT DOCUMENTS

| | | | |
|---|---|---|---|
| 5,467,606 A * | 11/1995 | Sasaki et al. | 62/160 |
| 5,613,369 A * | 3/1997 | Sato et al. | 62/89 |
| 6,907,745 B2 * | 6/2005 | Turner et al. | 62/160 |
| 6,968,708 B2 * | 11/2005 | Gopalnarayanan et al. | 62/186 |
| 7,665,319 B2 * | 2/2010 | Hsieh et al. | 62/178 |
| 2003/0225542 A1 * | 12/2003 | Liu et al. | 702/132 |
| 2005/0257538 A1 * | 11/2005 | Hwang et al. | 62/179 |
| 2005/0257539 A1 * | 11/2005 | Lee et al. | 62/180 |

FOREIGN PATENT DOCUMENTS

| | | | | |
|---|---|---|---|---|
| JP | 09060924 A * | 3/1997 | | F24F 3/00 |
| JP | 11-063627 A | 3/1999 | | |
| JP | 2001065951 A * | 3/2001 | | F24F 11/02 |
| JP | 2006322618 A * | 11/2006 | | |

OTHER PUBLICATIONS

JP1163627A (English Machine Trasnlation).*

JP2001065951A (English Machine Translation).*

JP2006322618A (English Machine Translation).*

* cited by examiner

AIR CONDITIONER HAVING A VARIABLE SPEED INDOOR SIDE BLOWER AND FLAPS BEING CONTROL BASED ON OUTSIDE AIR TEMPERATURE AND INDOOR HEAT EXCHANGER TEMPERATURE

BACKGROUND OF THE INVENTION

The present invention relates to an air conditioner which blows air subjected to heat exchange between the air and an indoor side heat exchanger to perform at least heating of a room to be conditioned, thereby enabling effective air conditioning in accordance with an outside air temperature.

Heretofore, for example, an air conditioner having a refrigerating cycle constituted of a compressor, a condenser, a pressure reducing unit and an evaporator has been used for air conditioning such as cooling, heating or drying in a room to be conditioned. When a cooling operation is performed, an indoor side heat exchanger operates as the evaporator to cool the inside of the room to be conditioned. When a heating operation is performed, the indoor side heat exchanger operates as the evaporator to heat the inside of the room to be conditioned.

In a main body of an indoor unit provided with the indoor side heat exchanger, a blower is disposed which sucks air into the main body through a suction port and discharges the air subjected to heat exchange between the air and the indoor side heat exchanger through a blowing port. When this blower is set to an 'automatic air flow' operation, a revolution speed, i.e., a velocity (flow rate) of the air discharged from the indoor unit is controlled based on a difference between a set temperature set by a controller and a temperature in the room to be conditioned detected by a room temperature sensor (a sucked air temperature) (e.g., see Japanese Patent Application Laid-Open No. 5-332593).

On the other hand, when an outside air temperature is low, a floor surface temperature is often remarkably lower than a room temperature in the room where the air conditioner is installed. In this case, during the above-mentioned 'automatic flow rate' operation, when the present indoor temperature rises as much as a certain degree by hot air discharged from the air conditioner installed in an upper part of the room, the flow rate is automatically switched from 'strong wind' to 'weak wind', 'breeze' or the like. In this case, a person in the room feels coldness from a floor surface or a wall surface having a low temperature, and hence feels that the flow rate lowers although a feeling temperature is lower than the present temperature (the displayed present temperature). In particular, when the outside air temperature is low, the person is remarkably influenced by the lowered floor surface temperature, and feels slowness in a heating speed.

The present invention has been developed to solve the conventional technical problems, and an object thereof is to provide an air conditioner which can realize appropriate air conditioning control in a situation close to a feeling temperature even when a floor surface temperature in a room to be conditioned is low.

SUMMARY OF THE INVENTION

To achieve the above object, according to a first aspect of the present invention, there is provided an air conditioner which blows air subjected to heat exchange between the air and an indoor side heat exchanger into a room to be conditioned by an indoor side blower, comprising: a controller which controls a revolution speed of the indoor side blower based on the present temperature of the room to be conditioned and a set temperature, characterized in that this controller raises the revolution speed of the indoor side blower in a case where an outside air temperature is not higher than a predetermined revolution speed rise temperature during a heating operation.

A second aspect of the present invention is characterized in that in the above aspect, the controller sets a revolution speed rise amount of the indoor side blower to a maximum value in a case where the outside air temperature is not higher than a predetermined maximum rise temperature which is lower than the revolution speed rise temperature, and the controller lowers the revolution speed rise amount, as the outside air temperature rises to the revolution speed rise temperature, in a case where the outside air temperature is higher than the maximum rise temperature.

A third aspect of the present invention is characterized in that in the above aspects of the invention, the controller corrects the revolution speed rise amount of the indoor side blower in accordance with the outside air temperature in such a direction as to lower the revolution speed rise amount in a case where the temperature of the indoor side heat exchanger is not higher than a predetermined hot air compensation temperature.

A fourth aspect of the present invention is characterized in that in the above aspects of the invention, the controller sets the revolution speed rise amount of the indoor side blower to zero in accordance with the outside air temperature in a case where the temperature of the indoor side heat exchanger is not higher than a predetermined cold air limitation canceling temperature which is lower than the hot air compensation temperature, and the controller decreases correction of the revolution speed rise amount of the indoor side blower in accordance with the outside air temperature, as the temperature of the indoor side heat exchanger rises to the hot air compensation temperature, in a case where the temperature of the indoor side heat exchanger is higher than the cold air limitation canceling temperature.

A fifth aspect of the present invention is characterized in that the above aspects of the invention comprise air direction regulating means disposed at a blowing port of the air blown from the indoor side blower so that an angle thereof is variable, and the controller allows the air direction regulating means to direct the air blown through the blowing port toward the floor surface of the room to be conditioned in a case where the outside air temperature is not higher than a predetermined value during the heating operation.

A sixth aspect of the present invention is characterized in that in the above aspects of the invention, the controller varies the angle of the air direction regulating means in accordance with an operation mode, and directs the air direction regulating means toward the floor surface of the room to be conditioned from an initially set angle in a case where the outside air temperature is not higher than the predetermined value during the heating operation.

A seventh aspect of the present invention is characterized in that in the above fifth aspect of the invention, the controller has a function of swinging the air direction regulating means, varies a swing angle range of the air direction regulating means in accordance with the operation mode, and changes the swing angle range of the air direction regulating means to a range directed to the floor surface of the room to be conditioned from an initially set range in a case where the outside air temperature is not higher than the predetermined value during the heating operation.

An eighth aspect of the present invention is characterized in that the first to fourth aspects of the invention comprise air direction regulating means disposed at a blowing port of the air blown from the indoor side blower so that an angle thereof is variable; and a human sensor which detects presence/absence of a human body, and the controller directs the air blown through the blowing port in a direction where the human body is present based on an output of the human sensor in a case where the outside air temperature is not higher than the predetermined value during the heating operation.

A ninth aspect of the present invention is characterized in that the above first to fourth aspects of the present invention comprise air direction regulating means disposed at a blowing port of the air blown from the indoor side blower so that an angle thereof is variable; and a human sensor which detects presence/absence of a human body, and the controller directs the air blown through the blowing port in a direction other than a direction where the human body is present based on an output of the human sensor in a case where the outside air temperature is not higher than the predetermined value during the heating operation.

According to the first aspect of the present invention, the air conditioner which blows the air subjected to the heat exchange between the air and the indoor side heat exchanger into the room to be conditioned by the indoor side blower comprises the controller which controls the revolution speed of the indoor side blower based on the present temperature of the room to be conditioned and the set temperature, and this controller raises the revolution speed of the indoor side blower in the case where the outside air temperature is not higher than the predetermined revolution speed rise temperature during the heating operation, which enables control of a flow rate of the air blown into the room to be conditioned in consideration of the outside air temperature.

That is, usually in a case where the outside air temperature is low, even when the present temperature at which the temperature of a space in the room to be conditioned is detected comes close to the set temperature, especially a floor surface temperature in the room to be conditioned often remains to be low, and a feeling temperature seems to be low. However, as in the present invention, when the outside air temperature is not higher than the predetermined revolution speed rise temperature, the revolution speed of the indoor side blower is raised, whereby even when the present temperature comes close to the set temperature, a predetermined flow rate of the air discharged from the indoor side blower can be acquired. Therefore, feeling of shortage of a heating ability can be eliminated by use of the outside air temperature as an index. In consequence, it is possible to realize appropriate air conditioning control in a situation closer to the feeling temperature.

According to the second aspect of the present invention, in addition to the above aspect, the controller sets the revolution speed rise amount of the indoor side blower to the maximum value in the case where the outside air temperature is not higher than the predetermined maximum rise temperature which is lower than the revolution speed rise temperature, and the controller lowers the revolution speed rise amount, as the outside air temperature rises to the revolution speed rise temperature, in the case where the outside air temperature is higher than the maximum rise temperature, whereby it is possible to accurately control the revolution speed rise amount of the indoor side blower in accordance with the outside air temperature and to realize more appropriate air conditioning control.

According to the third aspect of the present invention, in addition to the above aspects of the invention, the controller corrects the revolution speed rise amount of the indoor side blower in accordance with the outside air temperature in such a direction as to lower the revolution speed rise amount in the case where the temperature of the indoor side heat exchanger is not higher than the predetermined hot air compensation temperature. In consequence, it is possible to decrease the amount of the hot air blown into the room to be conditioned by the indoor side blower, which has been subjected to heat exchange between the air and the indoor side heat exchanger having a temperature which is not higher than the hot air compensation temperature. This can eliminate a disadvantage that a person in the room feels coldness when a large amount of hot air having a lower temperature is blown.

According to the fourth aspect of the present invention, in addition to the above aspects of the invention, the controller sets the revolution speed rise amount of the indoor side blower to zero in accordance with the outside air temperature in the case where the temperature of the indoor side heat exchanger is not higher than the predetermined cold air limitation canceling temperature which is lower than the hot air compensation temperature, which can eliminate the feeling of the coldness when cold air is blown into the room to be conditioned.

Moreover, the controller decreases the correction of the revolution speed rise amount of the indoor side blower in accordance with the outside air temperature, as the temperature of the indoor side heat exchanger rises to the hot air compensation temperature, in the case where the temperature of the indoor side heat exchanger is higher than the cold air limitation canceling temperature, whereby it is possible to accurately control the revolution speed rise amount of the indoor side blower in accordance with a heating degree of the indoor side heat exchanger, i.e., the temperature of the indoor side heat exchanger, which can realize more appropriate air conditioning control.

According to the fifth aspect of the present invention, in addition to the above aspects of the invention, the air conditioner further comprises the air direction regulating means disposed at the blowing port of the air blown from the indoor side blower so that the angle thereof is variable, and the controller allows the air direction regulating means to direct the air blown through the blowing port toward the floor surface of the room to be conditioned in the case where the outside air temperature is not higher than the predetermined value during the heating operation, whereby when the outside air temperature is low, the hot air can positively be supplied to the floor surface of the room to be conditioned where the hot air does not easily spread.

In consequence, the floor surface temperature which incurs lowering of the feeling temperature can be raised earlier, and the feeling of the shortage of the heating ability can be eliminated by use of the outside air temperature as the index. This can realize appropriate air conditioning control in a situation closer to the feeling temperature.

According to the sixth aspect of the present invention, in addition to the above aspects of the invention, the controller varies the angle of the air direction regulating means in accordance with the operation mode, and directs the air direction regulating means toward the floor surface of the room to be conditioned from the initially set angle in the case where the outside air temperature is not higher than the predetermined value during the heating operation, whereby it is possible to positively heat the floor surface having a temperature which easily lowers when the outside air temperature is low, thereby realizing the effective heating operation.

According to the seventh aspect of the present invention, in addition to the above fifth aspect of the invention, the controller has the function of swinging the air direction regulating means, varies the swing angle range of the air direction regulating means in accordance with the operation mode, and changes the swing angle range of the air direction regulating means to the range directed to the floor surface of the room to be conditioned from the initially set range in the case where the outside air temperature is not higher than the predetermined value during the heating operation, whereby it is possible to regulate the swing angle range of the air blown through the blowing port in accordance with the outside air temperature, thereby realizing the effective heating operation.

According to the eighth aspect of the present invention, in addition to the first to fourth aspects of the invention, the air conditioner further comprises the air direction regulating means disposed at the blowing port of the air blown from the indoor side blower so that the angle thereof is variable; and the human sensor which detects the presence/absence of the human body, and the controller directs the air blown through the blowing port in the direction where the human body is present based on the output of the human sensor in the case where the outside air temperature is not higher than the predetermined value during the heating operation, whereby it is possible to positively supply the hot air toward the person in the room who feels that the feeling temperature is low by use of the outside air temperature as the index.

This can eliminate the feeling of the shortage of the heating ability and realize appropriate air conditioning control in the situation closer to the feeling temperature.

According to the ninth aspect of the present invention, in addition to the above first to fourth aspects of the invention, the air conditioner further comprises the air direction regulating means disposed at the blowing port of the air blown from the indoor side blower so that the angle thereof is variable; and the human sensor which detects the presence/absence of the human body, and the controller directs the air blown through the blowing port in the direction other than the direction where the human body is present based on the output of the human sensor in the case where the outside air temperature is not higher than the predetermined value during the heating operation, whereby it is possible to eliminate feeling of discomfort produced when the hot air discharged from the indoor side blower operated by raising the revolution speed is blown directly to the person in the room in a case where the outside air temperature is not higher than the predetermined value. This can realize comfortable air conditioning control.

DETAILED DESCRIPTION OF THE PREFERRED EMBODIMENT

Figure 1:
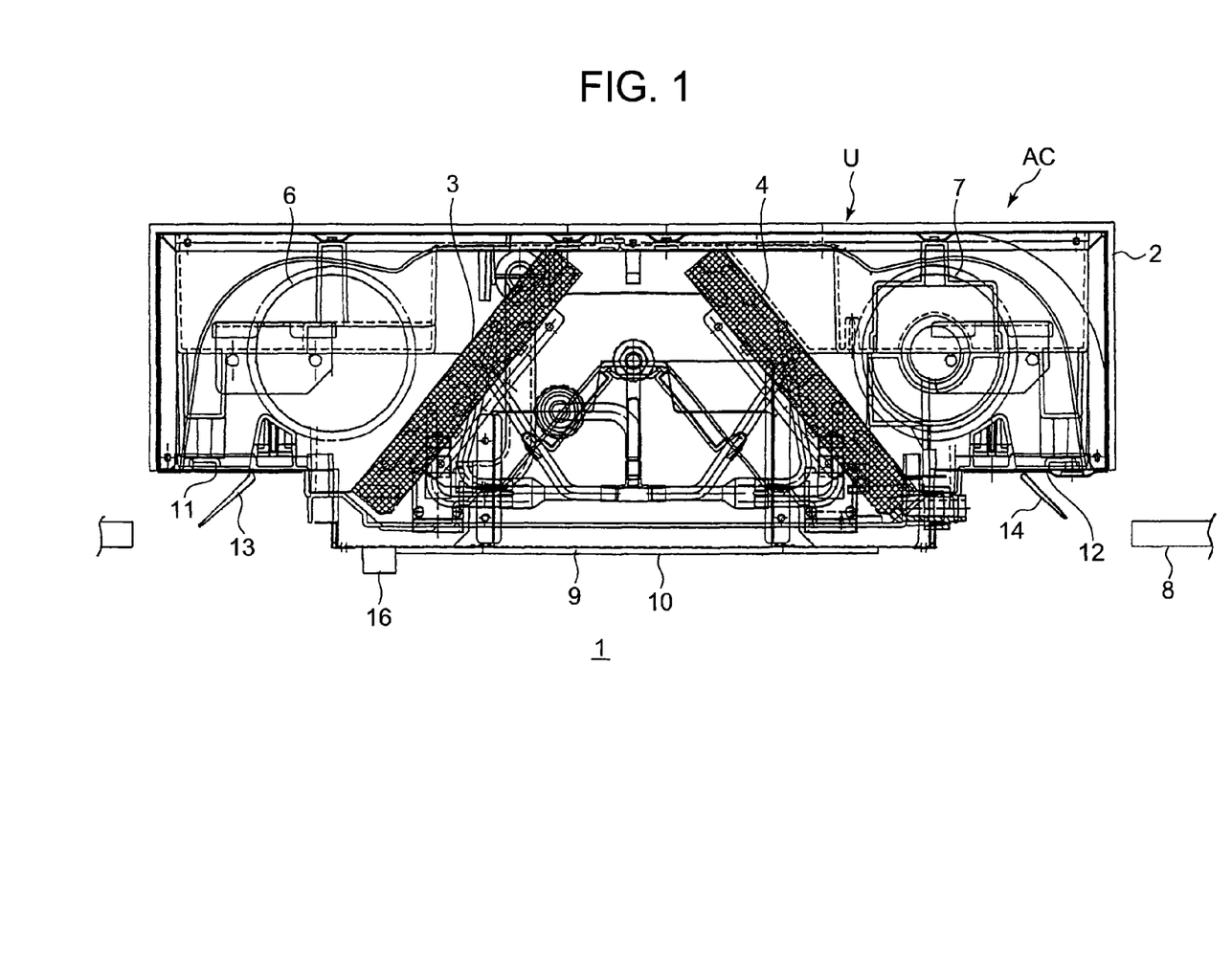
FIG. 1 is a sectional view of a user side unit of an air conditioner of one embodiment to which the present invention is applied.
Figure 2:
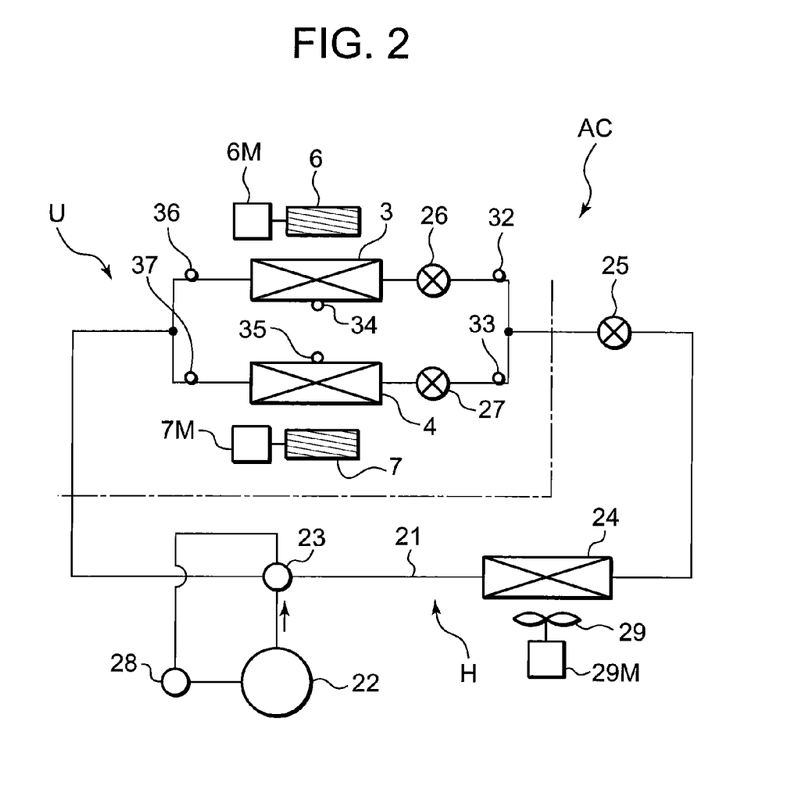
FIG. 2 is a refrigerant circuit diagram of the air conditioner of FIG. 1.
Figure 3:
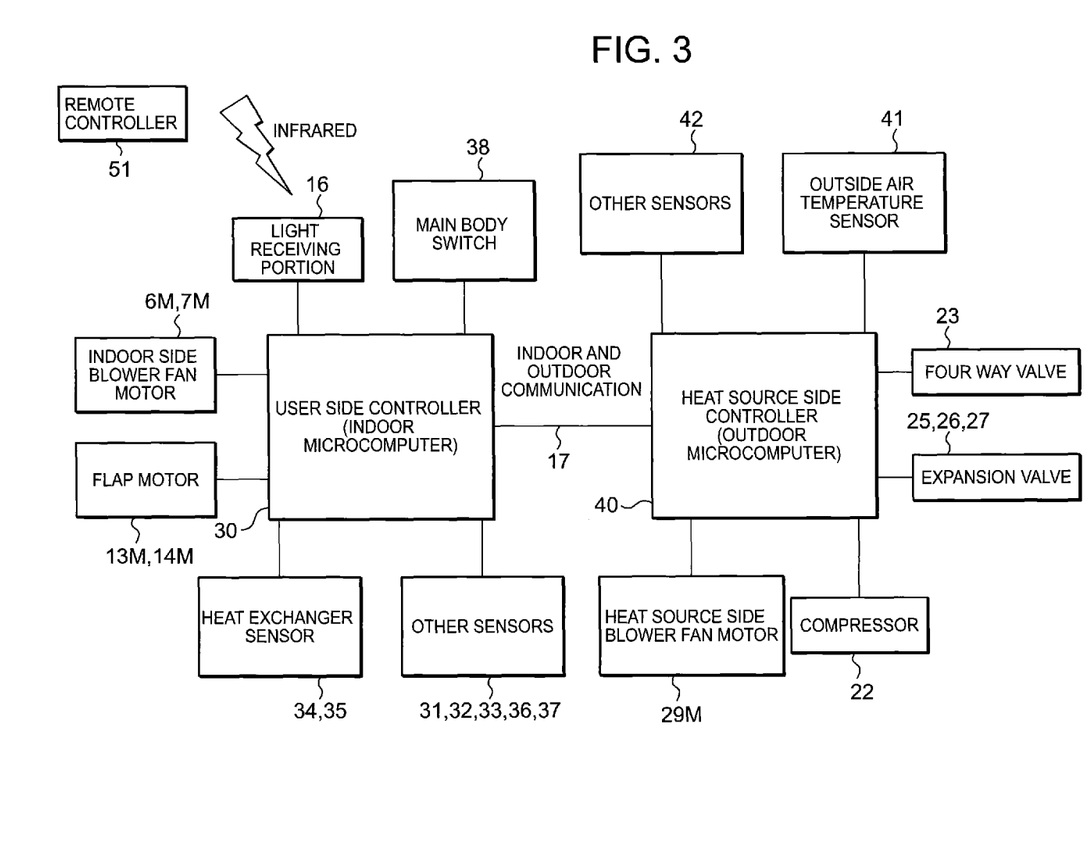
FIG. 3 is an electric circuit diagram of a user side unit of the air conditioner of FIG. 1.

Hereinafter, one embodiment of the present invention will be described in detail with reference to the drawings. FIG. 1 shows a sectional view of a user side unit (an indoor unit) U of an air conditioner AC to which the present invention is applied, FIG. 2 shows a refrigerant circuit diagram of the air conditioner AC, and FIG. 3 shows an electric circuit diagram of the user side unit U.

In FIG. 1, the user side unit U includes a main body 2 made of a sheet metal in which two user side heat exchangers (indoor side heat exchangers) 3 and 4 and two indoor side blowers 6 and 7 each comprising a cross flow fan are incorporated, and the unit is fitted in a ceiling so as to close a ceiling surface 8 in a room (a room to be conditioned) 1. The indoor side blowers 6 and 7 are so-called inverter blowers (blowers having a variable revolution speed) each having the revolution speed controlled by an inverter. A suction port 9 is formed in the center of the lower surface of the main body 2 along substantially the same plane as the ceiling surface 8, and blowing ports 11 and 12 are formed on both sides of the suction port. Moreover, a filter 10 is attached to the suction port 9.

The lower ends of the user side heat exchangers 3 and 4 are positioned on both the sides of the suction port 9, upper ends thereof are inclined so as to come close to the upside above the center of the suction port 9, and the indoor side blowers 6 and 7 are interposed between the user side heat exchangers 3 and 4 and the blowing ports 11 and 12. Moreover, when the blowers 6 and 7 are operated, air is sucked from the room 1 through the suction port 9, and flows into the user side heat exchangers 3 and 4.

Furthermore, the conditioned air which has flowed into the user side heat exchanger 3 and has been subjected to heat exchange is accelerated by the blower 6, and blown into the room 1 through the blowing port 11. Moreover, the conditioned air which has flowed into the user side heat exchanger 4 and has been subjected to the heat exchange is accelerated by the blower 7, and blown into the room 1 through the blowing port 12. In consequence, air conditioning in the room 1 is performed.

In this case, flaps 13 and 14 as air direction regulating means are attached to the blowing ports 11 and 12, respectively, and a blowing direction (an air direction) of the conditioned air is vertically controlled in accordance with flap positions (angles) of the flaps 13 and 14. Moreover, a light receiving portion 16 of infrared light from a remote controller described later is attached to the lower surface of the user side unit U.

Next, in FIG. 2, the air conditioner AC of the embodiment is constituted of the ceiling fit type user side unit U installed in the room 1 as described above, and a heat source side unit (an outdoor unit) H installed outdoors, and both the units are connected via a refrigerant piping line 21.

In this diagram, reference numeral 22 is a so-called inverter compressor (a variable ability type compressor, hereinafter referred to as the compressor) having an operation ability controlled by an inverter. Examples of compressor ability varying means include frequency control in a case where an AC motor is used, voltage control in a case where a DC motor is used and discharge amount control in a case where a variable capacity valve is used. Reference numeral 23 is a four way switch valve for switching a flow of a refrigerant during a cooling/heating operation, 24 is a heat source side heat exchanger (an outdoor heat exchanger), 25 is an electromotive expansion valve, 26 and 27 are flow dividing electromotive expansion valves, 3 and 4 are the user side heat exchangers, and 28 is an accumulator.

In this case, the user side heat exchanger 3 is connected in series with the flow dividing electromotive expansion valve 26, the user side heat exchanger 4 is connected in series with the flow dividing electromotive expansion valve 27, and series circuits are connected in parallel with each other.

In such a constitution, the refrigerant discharged from the compressor 22 has a flowing direction determined by a switch position of the four way switch valve 23 in accordance with three operation modes, i.e., a cooling operation, a heating operation and a dry operation.

That is, during the cooling operation, the high-temperature high-pressure refrigerant discharged from the compressor 22 flows through the four way switch valve 23, the heat source side heat exchanger 24 and the electromotive expansion valve 25, and is then divided, so that one refrigerant flows into the user side heat exchanger 3 through the flow dividing electromotive expansion valve 26, and the other refrigerant flows into the user side heat exchanger 4 through the flow dividing electromotive expansion valve 27. Subsequently, the refrigerants exiting from the user side heat exchangers 3 and 4 join each other, and circulate through the four way switch valve 23 and the accumulator 28 in this order. At this time, the heat source side heat exchanger 24 functions as a condenser and the user side heat exchangers 3 and 4 function as evaporators.

Next, during the heating operation, the high-temperature high-pressure refrigerant discharged from the compressor 22 flows through the four way switch valve 23, and is then divided, so that one refrigerant flows into the flow dividing electromotive expansion valve 26 through the user side heat exchanger 3, and the other refrigerant flows into the flow dividing electromotive expansion valve 27 through the user side heat exchanger 4. Subsequently, the refrigerants circulate through the electromotive expansion valve 25, the heat source side heat exchanger 24, the four way switch valve 23 and the accumulator 28 in this order. At this time, the user side heat exchangers 3 and 4 function as condensers and the heat source side heat exchanger 24 functions as an evaporator.

It is to be noted that during the dry operation, the refrigerant flows in the same manner as in the cooling operation, but the electromotive expansion valve 25 is totally opened, a front stage in each of the user side heat exchangers 3 and 4 functions as the condenser, and then after pressure reduction, a rear stage therein functions as the evaporator, thereby producing a humidity removing function.

Next, control means of the air conditioner AC will be described with reference to a control block diagram of FIG. 3. The user side unit U constituting the air conditioner AC is provided with a user side controller (control means or an indoor microcomputer) 30 comprising a general-purpose microcomputer including a storage portion (a memory) (not shown) capable of storing various data, and the heat source side unit H similarly constituting the air conditioner AC is provided with a heat source side controller (control means or an outdoor microcomputer) 40 comprising a general-purpose microcomputer including a storage portion (a memory) (not shown) capable of storing various data.

The user side controller 30 is connected to a room temperature sensor 31 attached to the user side unit U to detect a temperature in the room 1, inlet temperature sensors 32 and 33, heat exchanger sensors 34 and 35 and outlet temperature sensors 36 and 37. The room temperature sensor 31 for detecting the temperature in the room 1 is not limited to a sensor attached to the user side unit U, and may be another sensor incorporated in a remote controller 51 described later.

As shown in FIG. 2, the inlet temperature sensor 32 is disposed along a piping line on a refrigerant inlet side of the user side heat exchanger 3 during the above cooling operation, and the inlet temperature sensor 33 is similarly disposed along a piping line on a refrigerant inlet side of the user side heat exchanger 4 during the cooling operation. Moreover, the heat exchanger sensor 34 is attached to the user side heat exchanger 3, and the heat exchanger sensor 35 is attached to the user side heat exchanger 4. Furthermore, the outlet temperature sensor 36 is disposed along a piping line on a refrigerant output side of the user side heat exchanger 3 during the cooling operation, and the outlet temperature sensor 37 is similarly disposed along a piping line on a refrigerant outlet side of the user side heat exchanger 4 during the cooling operation.

Moreover, the user side controller 30 is connected to fan motors 6M and 7M comprising AC motors which drive the indoor side blowers 6 and 7 to control a revolution speed by an inverter, or DC brushless motors, so that a flow rate of air blown through the blowing ports 11 and 12 can substantially linearly be varied. Furthermore, the user side controller 30 is connected to flap motors 13M and 14M comprising stepping motors which drive the flaps 13 and 14 to adjust flap positions (angles: the air direction). Similarly, the user side controller is also provided with the light receiving portion 16 and a power source switch (a main body switch) 38.

Furthermore, the heat source side controller 40 is connected to the compressor 22, the four way switch valve 23, the electromotive expansion valve 25, and the flow dividing electromotive expansion valves 26 and 27. Furthermore, the controller is connected to a fan motor 29M of a blower 29 for the heat source side heat exchanger 24. Moreover, the heat source side controller 40 is connected to an outside air temperature sensor 41 which detects the outside air temperature and various sensors 42 such as a compressor temperature sensor which detects the temperature of the compressor 22 and a heat exchanger sensor which detects the temperature of the heat source side heat exchanger 24. The user side controller 30 and the heat source side controller 40 transmit data to and receive data from each other via an indoor and outdoor communication line 17, to perform an operation of the air conditioner AC.

Figure 4:
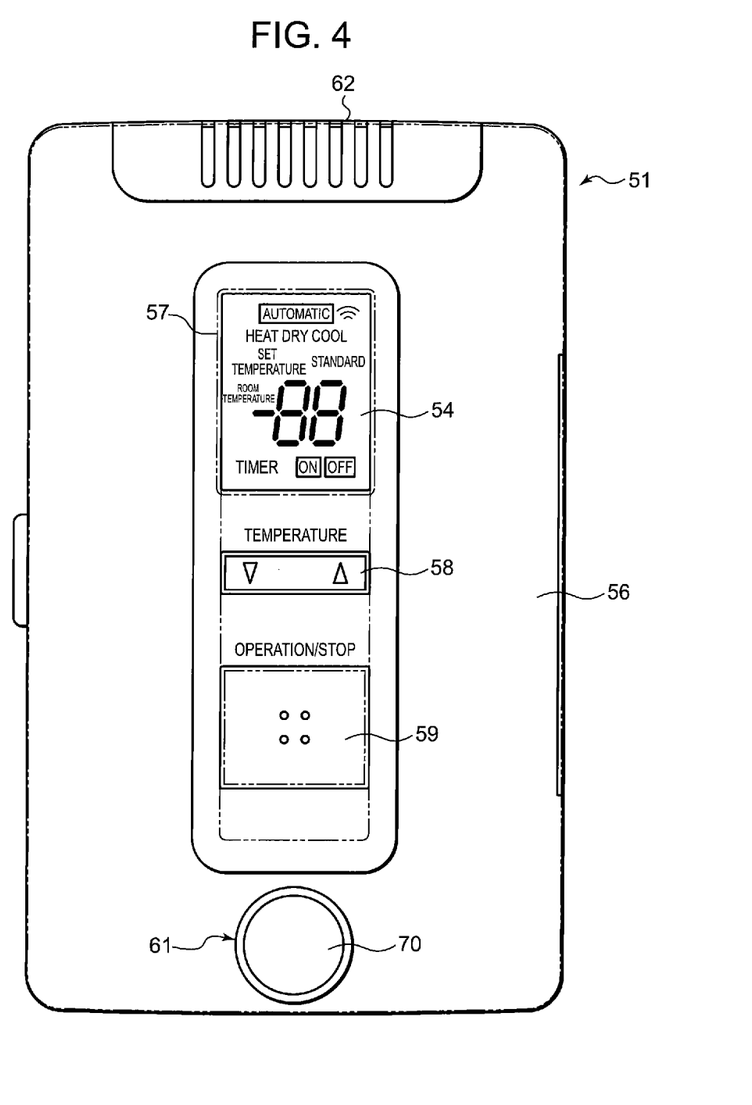
FIG. 4 is a front view of a remote controller of the air conditioner of FIG. 1.
Figure 5:
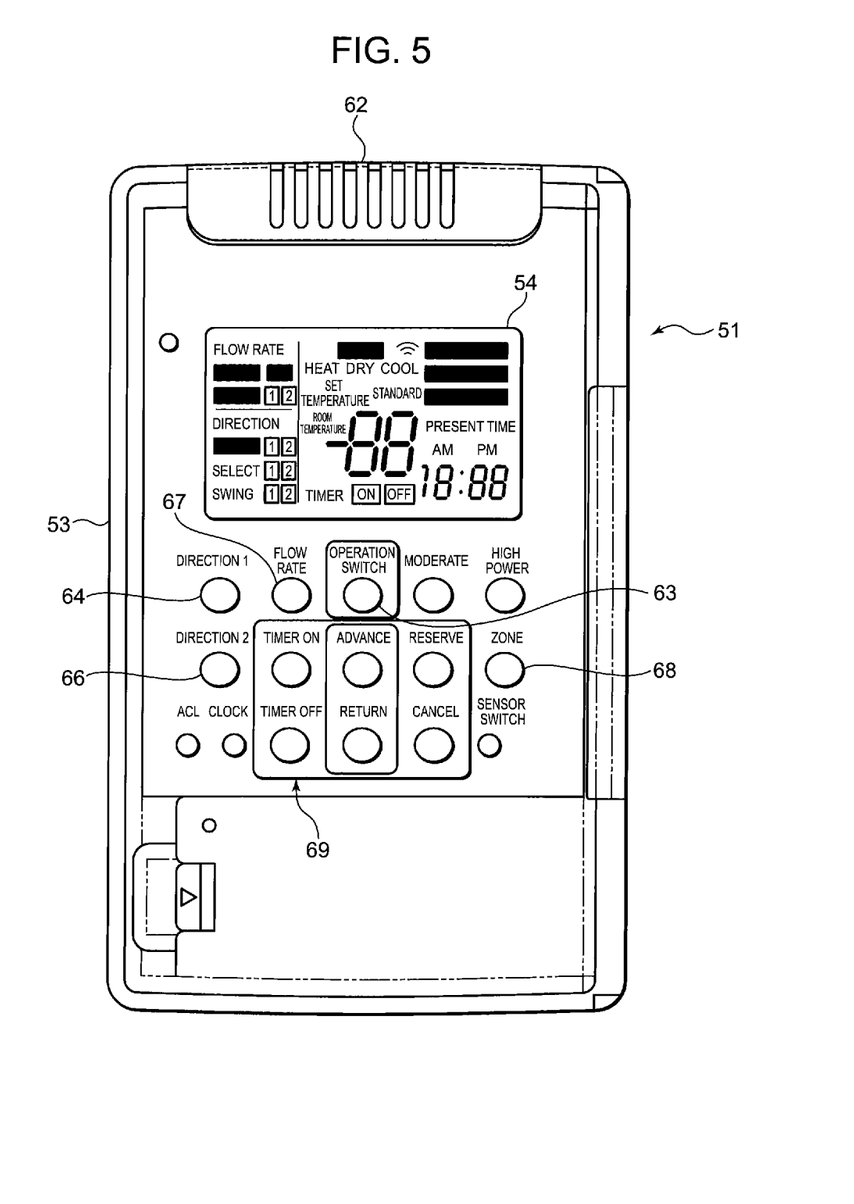
FIG. 5 is a front view of the remote controller of FIG. 4 from which a cover is removed.

Next, a structure of the remote controller 51 (input means) for use in the embodiment will be described with reference to FIG. 4 and FIG. 5, while the operation of the air conditioner AC will be described. As shown in FIG. and FIG. 5, the remote controller 51 is made of a hard synthetic resin, and the upper part of the front surface of a main body 53 is provided with a liquid crystal display portion 54 as a display portion.

The main body 53 is covered with an openable/closable cover 56, and a part of the liquid crystal display portion 54 can visually be recognized through a window hole 57 of the cover 56. On the downside of the window hole 57 of the cover 56, a temperature setting switch 58 and an operation/stop switch 59 are attached. Moreover, on the further downside, a Fresnel lens 70 and a human sensor 61 comprising a pyroelectric sensor (not shown) are attached.

In the liquid crystal display portion 54, a set temperature, air direction selecting positions of the flaps 13 and 14 described later, a flap control mode and the like are displayed, and the set temperature can be set so as to rise or lower by an operation of the temperature setting switch 58. The user side controller 30 performs the operation or stop of the air conditioner AC based on the operation of the operation/stop switch 59. It is to be noted that reference numeral 62 is an infrared light emitting portion disposed at the upper end portion of the main body 53.

The user side controller 30 receives an infrared light signal from the remote controller 51 by the light receiving portion 16, and controls the operations (driving) of the fan motors 6M and 7M of the indoor side blowers 6 and 7 and the flap motors 13M and 14M based on data such as the set temperature based on the received signal or set data by a switch or the like disposed in the user side unit U itself and outputs of the room temperature sensor 31 and the temperature sensors 32 to 37. Moreover, the controller transmits a control signal to the heat source side controller 40 of the heat source side unit H to control the compressor 22, the four way switch valve 23 and the like, thereby adjusting an indoor temperature to the set temperature.

On the other hand, various switches for setting an operation state of the air conditioner AC in detail are disposed on the downside of the liquid crystal display portion 54 on the front surface of the main body 53 of the remote controller 51. In FIG. 5, reference numeral 63 is an operation changeover switch, and the air conditioner AC has the operation mode switched to the cooling operation, the heating operation and the dry operation by the operation changeover switch 63. It is to be noted that the operation states are displayed by the liquid crystal display portion 54.

Moreover, reference numerals 64 and 66 are air direction switches for adjusting the angles of the flaps 13 and 14 by the flap motors 13M and 14M, respectively, and the setting is switched at three positions, i.e., 'automatic', 'select' and 'swing' by the air direction switches 64 and 66. When the setting is set to be 'automatic', the user side controller 30 controls the flaps 13 and 14 at angles preset in accordance with each of the operation modes. Moreover, in case of 'select', the flaps can be regulated to favorite angles in a plurality of stages. Furthermore, in case of 'swing', the flaps 13 and 14 are automatically swung in a predetermined range and at a predetermined angle (a swing angle range) in a plurality of stages. In addition, this is also displayed in the liquid crystal display portion 54.

Reference numeral 67 is a flow rate switch which sets the flow rate of the air blown from the indoor side blowers 6 and 7, and the flow rate can be switched 'automatic', 'strong', 'medium' and 'weak' by the flow rate switch 67. Moreover, the flow rate of the blown air is also displayed in the liquid crystal display portion 54. Furthermore, reference numeral 68 is a zone switch for executing a zone control operation. Furthermore, reference numeral 69 is a switch group for setting a timer reserving operation. The remote controller 51 having such a constitution is attached to a wall surface in the room 1, and transmits data of the temperature sensors incorporated therein and data of the switches to the light receiving portion 16 of the user side unit U via the infrared light. Moreover, the human sensor 61 detects the movement of the human body in the room 1. The remote controller 51 similarly transmits the detection data of the human sensor 61 via the infrared light.

Figure 6:
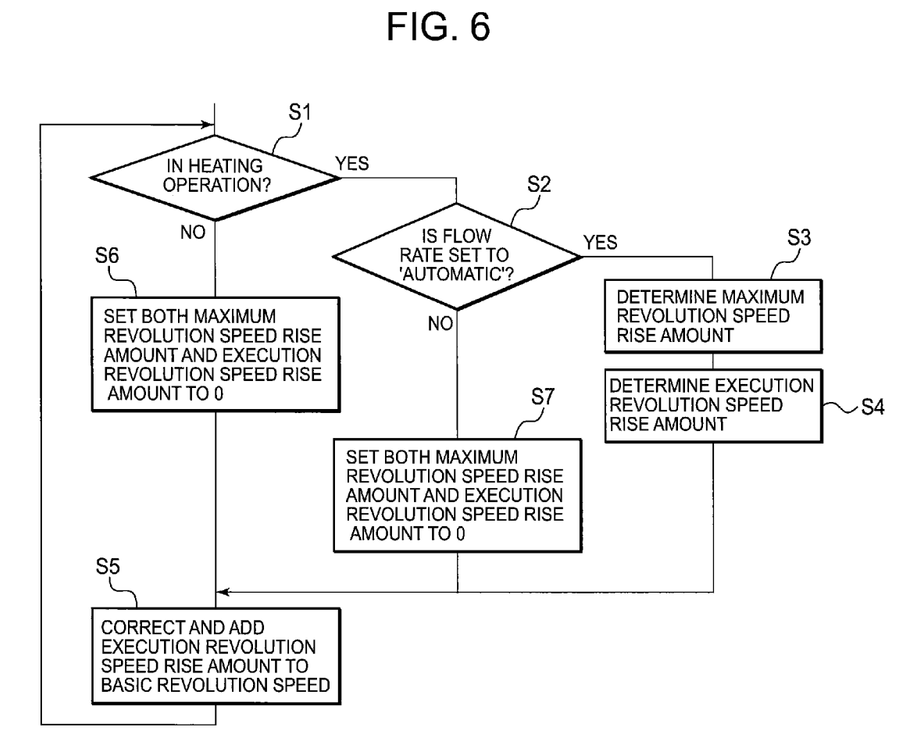
FIG. 6 is a flowchart of revolution speed rise correction control of an indoor side blower.

Next, revolution speed rise correction control of the indoor side blowers 6 and 7 and angle regulation control of the flaps 13 and 14 in a case where the operation mode is set to the heating operation will be described with reference to FIG. 6 to FIG. 8. FIG. 6 shows a flowchart of the revolution speed rise correction control of the indoor side blowers 6 and 7. First in step S1, the user side controller 30 judges whether or not the operation mode is set to the heating operation by the operation changeover switch 63 of the remote controller 51, and the step advances to step S2 when the mode is set to the heating operation. It is to be noted that when the mode is not set to the heating operation, the step advances to step S6 to set a maximum revolution speed rise amount and an execution revolution speed rise amount to zero as described later in detail, thereby advances to step S5.

In the step S2, the user side controller 30 judges whether or not the flow rate of the air blown through the blowing ports 11 and 12 is set to be 'automatic' in accordance with the revolution speed of the fan motors 6M and 7M of the indoor side blowers 6 and 7 by the flow rate switch 67 of the remote controller 51, and the step advances to step S3, when the flow rate is set to be 'automatic'. It is to be noted that when the flow rate is not set to be 'automatic', the step advances to step S7, the maximum revolution speed rise amount and the execution revolution speed rise amount are set to zero, thereby advancing to the step S5.

When the flow rate is set to be 'automatic', the user side controller 30 substantially linearly controls the revolution speed of the fan motors 6M and 7M of the indoor side blowers 6 and 7 based on a temperature difference between the set temperature set by the temperature setting switch 58 of the remote controller 51 and the present temperature (room temperature) in the room 1 detected by the room temperature sensor 31.

In step S3, the user side controller 30 determines the maximum revolution speed rise amount of the indoor side blowers 6 and 7. The maximum revolution speed rise amount of the indoor side blowers 6 and 7 are determined based on the outside air temperature. FIG. 7 shows a relation between the outside air temperature and the maximum revolution speed rise amount of the indoor side blowers 6 and 7.

In the user side controller 30, a beforehand set predetermined revolution speed rise temperature (B° C. in FIG. 7) is stored as a boundary value of the outside air temperature by which it is judged whether or not to perform the revolution speed rise correction control of the indoor side blowers 6 and 7. Moreover, in the user side controller 30, there is stored a predetermined maximum rise temperature (A° C. in FIG. 7) beforehand set to a temperature which is lower than the revolution speed rise temperature. In the present embodiment, the revolution speed rise temperature (B° C.) is set to, for example, +15° C., and the revolution speed rise temperature (A° C.) is set to, for example, +5° C. which is lower than the above temperature. These set temperatures may arbitrarily be changed, and the temperatures are not limited to 0° C. or higher, and may be 0° C. or lower.

The user side controller 30 sets the maximum revolution speed rise amount of the indoor side blowers 6 and 7 to a maximum value (C rpm in FIG. 7), when the outside air temperature detected by the outside air temperature sensor 41 disposed in the heat source side unit H is not higher than the maximum rise temperature (A° C.). Moreover, when the outside air temperature is higher than the maximum rise temperature (A° C.), the maximum revolution speed rise amount is lowered as the outside air temperature rises to the revolution speed rise temperature (B° C.). It is to be noted that in this case, the maximum revolution speed rise amount lowers, as the outside air temperature rises from the maximum rise temperature (A° C.) to the revolution speed rise temperature (B° C.). This relation may be a proportional relation as shown in FIG. 7. Additionally, the maximum revolution speed rise amount may be lowered by using a quadratic function.

Figure 7:
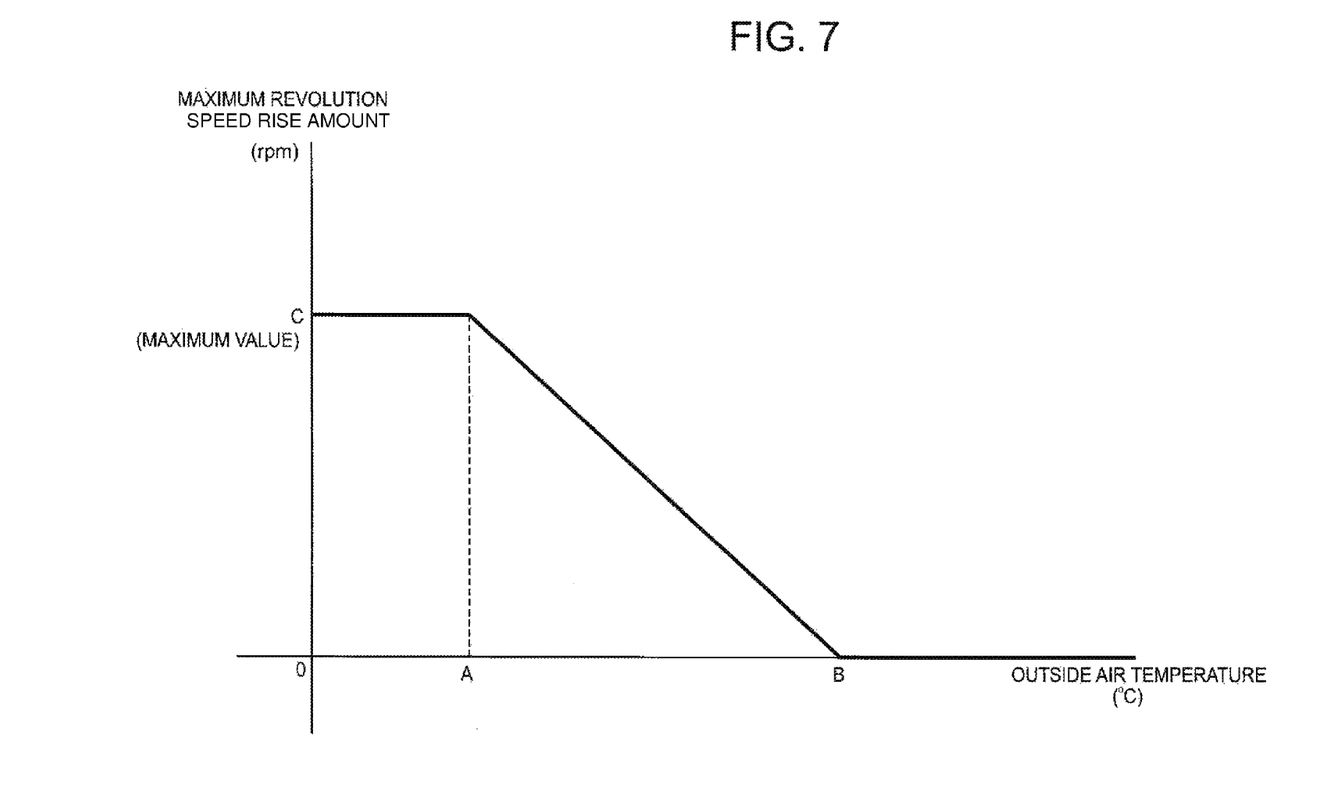
FIG. 7 is a diagram showing a maximum value of revolution speed rise amount of the indoor side blower with respect to an outside air temperature.
Figure 8:
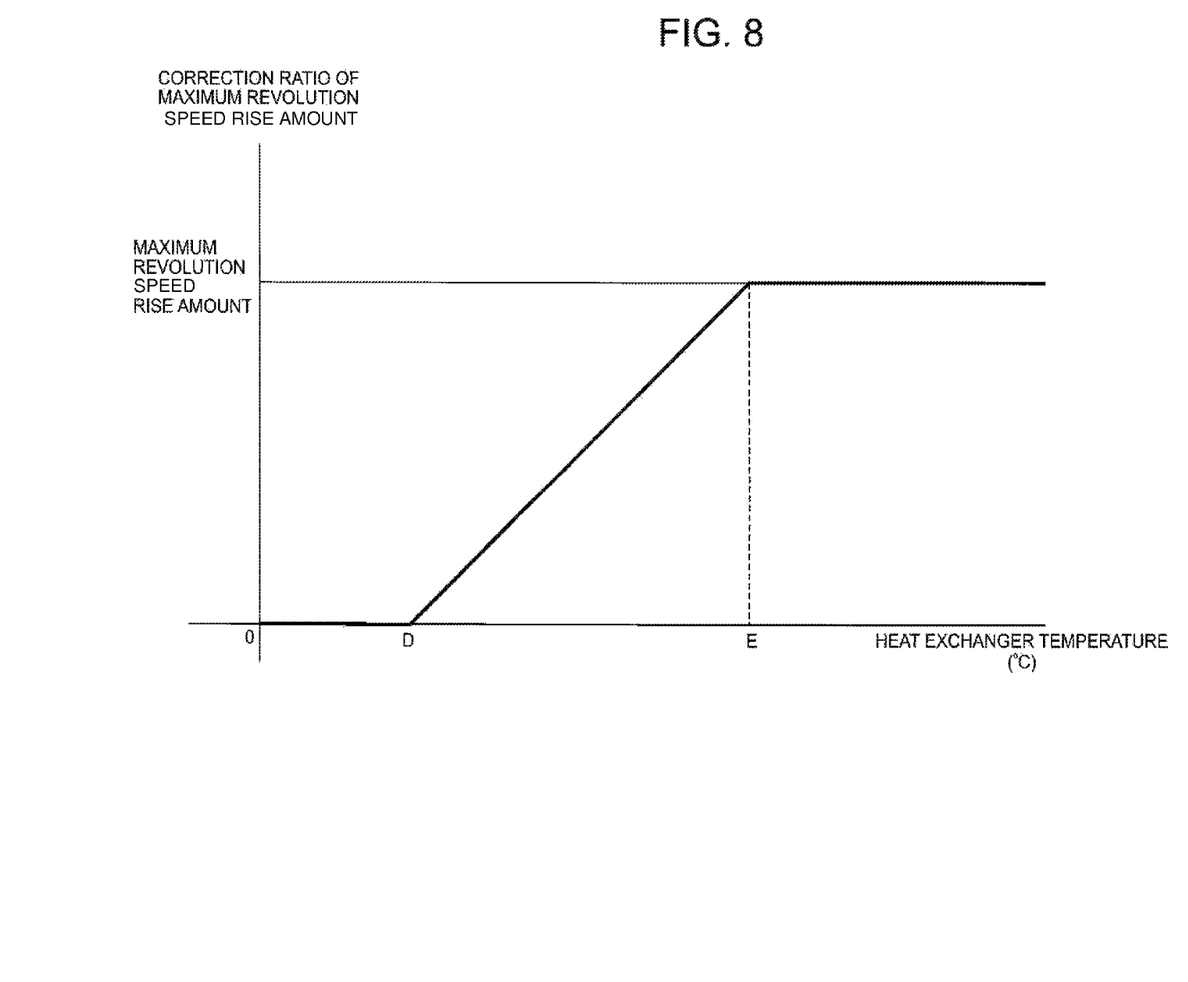
FIG. 8 is a diagram showing a relation between a temperature of a user side heat exchanger and a correction ratio with respect to a maximum revolution speed rise amount of the indoor side blower.

In consequence, the user side controller 30 can determine the maximum revolution speed rise amount of the indoor side blowers 6 and 7 from the relation of FIG. 7 based on the outside air temperature detected by the outside air temperature sensor 41.

After determining the maximum revolution speed rise amount as described above, the user side controller 30 advances to step S4 to determine the execution revolution speed rise amount. The execution revolution speed rise amount of the indoor side blowers 6 and 7 is determined by correcting the maximum revolution speed rise amount determined as described above based on the temperature of the user side heat exchangers (the indoor side heat exchanges) 3 and 4. FIG. 8 shows a relation between the temperature of the user side heat exchangers 3 and 4 and a correction ratio with respect to the maximum revolution speed rise amount of the indoor side blowers 6 and 7.

In the user side controller 30, a beforehand set predetermined hot air compensation temperature (E° C. in FIG. 8) is stored as a boundary value of the temperature of the user side heat exchangers 3 and 4 by which it is judged whether or not to set the execution revolution speed rise amount in the revolution speed rise correction control to the maximum revolution speed rise amount, i.e., whether or not to correct the maximum revolution speed rise amount. Furthermore, there is stored a predetermined cold air limitation canceling temperature (D° C. in FIG. 8) beforehand set to a temperature which is lower than the hot air compensation temperature. The hot air compensation temperature (E° C.) is a temperature which compensates that the conditioned air subjected to heat exchange between the air and the user side heat exchangers 3 and 4 and blown into the room 1 through the blowing ports 11 and 12 has a temperature which is not lower than a predetermined temperature, and the temperature is, for example, +45° C. in the present embodiment. The cold air limitation canceling temperature (D° C.) is a temperature which suppresses a disadvantage that when the blowers 6 and 7 are operated in a state where the user side heat exchangers 3 and 4 are not sufficiently heated, the low-temperature conditioned air is blow into the room 1, and the temperature is, for example, +40° C. which is lower than the hot air compensation temperature in the present embodiment. It is to be noted that these set temperatures can arbitrarily be changed.

Moreover, the user side controller 30 sets, to zero, the maximum revolution speed rise amount determined based on the outside air temperature as described above, when the temperature of the user side heat exchangers 3 and 4 detected by the heat exchanger sensors 34 and 35 is not higher than the cold air limitation canceling temperature (D° C.). Furthermore, when the temperature of the user side heat exchangers 3 and 4 is higher than the cold air limitation canceling temperature (D° C.), the controller decreases the correction of the maximum revolution speed rise amount as the temperature of the user side heat exchangers 3 and 4 rises to the hot air compensation temperature (E° C.).

That is, when the temperature of the heat exchangers 3 and 4 is not lower than the hot air compensation temperature (E° C.), the controller determines the maximum revolution speed rise amount determined in the step S3 as the execution revolution speed rise amount. Furthermore, when the temperature of the heat exchangers 3 and 4 is lower than the hot air compensation temperature (E° C.), the controller decreases a correction ratio (a degree) of the maximum revolution speed rise amount determined in the step S3 in accordance with a ratio (a degree) of a temperature difference with respect to the cold air limitation canceling temperature (D° C.). When the temperature difference between the hot air compensation temperature (E° C.) and the cold air limitation canceling temperature (D° C.) is, for example, +5° C. and the temperature of the heat exchangers 3 and 4 is +1° C. higher than the cold air limitation canceling temperature (D° C.), the ratio of the temperature difference is 20%, and hence the controller sets the execution revolution speed rise amount to be 20% of the maximum revolution speed rise amount determined in the step S3. The correction ratio at this time is 80%. On the other hand, when the temperature of the heat exchangers 3 and 4 is +3° C. higher than the cold air limitation canceling temperature (D° C.), the ratio of the temperature difference is 60%, and hence the controller sets the execution revolution speed rise amount to be 60% of the maximum revolution speed rise amount determined in the step S3. The correction ratio at this time is 20%. In consequence, the controller decreases the correction ratio (the degree) of the maximum revolution speed rise amount determined in the step S3 as the temperature of the heat exchangers 3 and 4 rises to the hot air compensation temperature (E° C.).

It is to be noted that in this case, when the temperature of the heat exchangers 3 and 4 rises from the cold air limitation canceling temperature (D° C.) to the hot air compensation temperature (E° C.), the correction of the maximum revolution speed rise amount decreases. This relation may be a proportional relation shown in FIG. 8. Additionally, the correction may decrease by using a quadratic function.

In consequence, the user side controller 30 can correct the determined maximum revolution speed rise amount of the indoor side blowers 6 and 7 based on the temperature of the user side heat exchangers 3 and 4 to determine the execution revolution speed rise amount based on the outside air temperature detected by the outside air temperature sensor 41.

Afterward, the user side controller 30 advances to the step S5 to add the execution revolution speed rise amount determined in the step S4 to the revolution speed of the fan motors 6M and 7M of the indoor side blowers 6 and 7 controlled based on the temperature difference between the set temperature set by the temperature setting switch 58 of the remote controller 51 and the present temperature (the room temperature) in the room 1 detected by the room temperature sensor 31 as described above, thereby controlling the fan motors 6M and 7M to obtain the added revolution speed.

In consequence, when the heating operation is performed in accordance with the 'automatic' flow rate and the outside air temperature detected by the outside air temperature sensor 41 is lower than the revolution speed rise temperature (B° C.), the controller raises, as much as the execution revolution speed rise amount, the revolution speed of the fan Motors 6M and 7M of the indoor side blowers 6 and 7 controlled based on the temperature difference between the set temperature and the present temperature, which enables control of the flow rate of the air blown into the room 1 in consideration of the outside air temperature.

That is, usually in a case where the outside air temperature is low, even when the present temperature at which the temperature of a space in the room 1 is detected comes close to the set temperature, especially a floor surface temperature in the room 1 often remains to be low, and a feeling temperature seems to be low. However, when the outside air temperature is not higher than the revolution speed rise temperature (B° C.) in this manner, the revolution speed of the indoor side blowers 6 and 7 is raised, whereby even when the present temperature comes close to the set temperature, a predetermined flow rate of the air discharged into the room 1 by the indoor side blowers 6 and 7 can be acquired. Therefore, feeling of shortage of a heating ability can be eliminated by use of the outside air temperature as an index. In consequence, it is possible to realize appropriate air conditioning control in a situation closer to the feeling temperature.

Especially in the present embodiment, the user side controller 30 sets the revolution speed rise amount of the indoor side blowers 6 and 7 to the maximum value in the case where the outside air temperature is not higher than the maximum rise temperature (A° C.) which is lower than the revolution speed rise temperature (B° C.), and the controller lowers the revolution speed rise amount, as the outside air temperature rises to the revolution speed rise temperature (B° C.), in the case where the outside air temperature is higher than the maximum rise temperature (A° C.), whereby it is possible to accurately control the revolution speed rise amount of the indoor side blowers 6 and 7 in accordance with the outside air temperature and to realize more appropriate air conditioning control.

Moreover, the user side controller 30 corrects the revolution speed rise amount of the indoor side blowers 6 and 7 in accordance with the outside air temperature in such a direction as to lower the revolution speed rise amount, to determine the execution revolution speed rise amount in the case where the temperature of the indoor side heat exchangers 3 and 4 is not higher than the hot air compensation temperature (E° C.). In consequence, it is possible to decrease the amount of the hot air blown into the room 1 by the indoor side blowers 6 and 7, which has been subjected to the heat exchange between the air and the indoor side heat exchangers 3 and 4 having a temperature that is not higher than the hot air compensation temperature (E° C.). This can eliminate a disadvantage that a person in the room feels coldness when a large amount of hot air having a lower temperature is blown into the room 1.

Furthermore, the user side controller 30 sets the revolution speed rise amount of the indoor side blowers 6 and 7 to zero in accordance with the outside air temperature in the case where the temperature of the indoor side heat exchangers 3 and 4 is not higher than the cold air limitation canceling temperature (D° C.) which is lower than the hot air compensation temperature (E° C.). This can eliminate the feeling of the coldness when the cold air is blown into the room 1.

Moreover, the user side controller 30 decreases the correction of the revolution speed rise amount of the indoor side blowers in accordance with the outside air temperature, i.e., controls the revolution speed rise amount so that the amount comes close to the maximum revolution speed rise amount, as the temperature of the indoor side heat exchangers 3 and 4 rises to the hot air compensation temperature (E° C.), in the case where the temperature of the indoor side heat exchangers 3 and 4 is higher than the cold air limitation canceling temperature (D° C.), whereby it is possible to accurately control the revolution speed rise amount of the indoor side blowers 6 and 7 in accordance with a heating degree of the indoor side heat exchangers 3 and 4, i.e., the temperature of the indoor side heat exchangers 3 and 4, which can realize more appropriate air conditioning control.

On the other hand, when the air direction control of the flaps 13 and 14 is set to be 'automatic' by the air direction switches 64 and 66, the flaps are so as to obtain a preset angle in accordance with each operation mode. Here, in a case where the heating operation is set, when the outside air temperature detected by the outside air temperature sensor 41 disposed in the heat source side unit H is not higher than a predetermined value, i.e., is not higher than the maximum rise temperature (A° C.) as described above in the present embodiment, the user side controller 30 further directs the angle of the flaps 13 and 14 by the flap motors 13M and 14M toward the floor surface in the room 1 from an angle beforehand set during the heating operation.

In consequence, when the revolution speed rise correction control of the indoor side blowers 6 and 7 is executed as described above, the direction of the hot air blown through the blowing ports 11 and 12 can be directed to the floor surface in the room 1 from the angle beforehand set during the heating operation. In consequence, the hot air can positively be supplied to the floor surface in the room 1 where the hot air does not easily spread, thereby realizing effective heating.

Moreover, in addition to the above revolution speed rise correction control, the floor surface temperature which incurs the lowering of the feeling temperature can be raised earlier, and the feeling of the shortage of the heating ability can be eliminated by use of the outside air temperature as the index. This can realize appropriate air conditioning control in a situation closer to the feeling temperature.

Furthermore, the air direction control of the flaps 13 and 14 is set to 'select' by the air direction switches 64 and 66 and can further be set to 'human body tracking mode'. At this time, the user side controller 30 directs the air blown through the blowing ports 11 and 12 in a direction where the human body is present in the swing angle range of the flaps 13 and 14 by the flap motors 13M and 14M based on the presence/absence of the human body detected by the human sensor 61 disposed in the remote controller 51 in a case where the heating operation is set and the outside air temperature detected by the outside air temperature sensor 41 is not higher than the predetermined value, i.e., is not higher than the maximum rise temperature (A° C.) described above in the present embodiment.

In consequence, the hot air can positively be supplied to the person in the room who feels that the feeling temperature is low by use of the outside air temperature as the index. In consequence, it is possible to eliminate the feeling of the shortage of the heating ability and to realize appropriate air conditioning control in a situation closer to the feeling temperature.

Moreover, the air direction control of the flaps 13 and 14 is set to 'select' by the air direction switches 64 and 66 and can further be set to 'human body avoiding mode'. At this time, the user side controller 30 directs the air blown through the blowing ports 11 and 12 in a direction other than the direction where the human body is present in the swing angle range of the flaps 13 and 14 by the flap motors 13M and 14M based on the presence/absence of the human body detected by the human sensor 61 disposed in the remote controller 51 in a case where the heating operation is set and the outside air temperature detected by the outside air temperature sensor 41 is not higher than the predetermined value, i.e., is not higher than the maximum rise temperature (A° C.) described above in the present embodiment.

In consequence, it is possible to eliminate feeling of discomfort produced when the hot air discharged from the indoor side blowers 6 and 7 operated by raising the revolution speed is blown directly to the person in the room in a case where the outside air temperature is not higher than the predetermined value, i.e., is not higher than the maximum rise temperature (A° C.) in this case. This can realize comfortable air conditioning control.

What is claimed is:

1. An air conditioner which blows air subjected to heat exchange between the air and an indoor side heat exchanger into a room to be conditioned by an indoor side blower, comprising:
a controller which controls a revolution speed of the indoor side blower based on the present temperature of the room to be conditioned and a set temperature,
wherein the controller raises the revolution speed of the indoor side blower in a case where an outside air temperature is not higher than a predetermined revolution speed rise temperature during a heating operation,
wherein the controller sets a revolution speed rise amount of the indoor side blower to a maximum value in a case where the outside air is not higher than a predetermined maximum rise temperature, which is lower than the predetermined revolution speed rise temperature, and the controller lowers the revolution speed rise amount of the indoor side blower as the outside air temperature rises to the predetermined revolution speed rise temperature, in a case where the outside air temperature is higher than the predetermined maximum rise temperature, wherein the controller corrects the set revolution speed rise amount of the indoor side blower determined based on the outside air temperature in such a direction as to lower the revolution speed rise amount in a case where a temperature of the indoor side heat exchanger is not higher than a predetermined hot air compensation temperature, and wherein the controller sets the revolution speed rise amount of the indoor side blower to zero in a case where the temperature of the indoor side heat exchanger is not higher than a predetermined cold air limitation canceling temperature which is lower than the predetermined hot air compensation temperature, and the controller decreases correction of the revolution speed rise amount of the indoor side blower as the temperature of the indoor side heat exchanger rises to the predetermined hot air compensation temperature, in a case where the temperature of the indoor side heat exchanger is higher than the predetermined cold air limitation canceling temperature.

\* \* \* \* \*